(12) United States Patent
Beatty (10) Patent No.: US 7,302,343 B2
(45) Date of Patent: Nov. 27, 2007

(54) COMPACT TEXT ENCODING OF LATITUDE/LONGITUDE COORDINATES

(75) Inventor: Bryan Beatty, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 368 days.

(21) Appl. No.: 10/631,611

(22) Filed: Jul. 31, 2003

(65) Prior Publication Data

US 2005/0023524 A1 Feb. 3, 2005

(51) Int. Cl.
*G06F 15/16* (2006.01)
(52) U.S. Cl. .................. 701/214; 382/229; 709/217; 707/3
(58) Field of Classification Search ............. 701/200, 701/201, 208, 213, 300, 214; 702/5; 707/1, 707/3; 341/50; 715/513; 382/229, 309, 382/187; 345/173; 709/217
See application file for complete search history.

(56) References Cited

U.S. PATENT DOCUMENTS

| | | | | |
|---|---|---|---|---|
| 5,734,749 | A * | 3/1998 | Yamada et al. | 382/187 |
| 6,119,069 | A * | 9/2000 | McCauley | 702/5 |
| 6,202,023 | B1 * | 3/2001 | Hancock et al. | 701/201 |
| 6,275,612 | B1 * | 8/2001 | Imoto | 382/189 |
| 6,442,483 | B1 * | 8/2002 | Doglione | 701/300 |
| 6,606,554 | B2 * | 8/2003 | Edge | 701/200 |
| 6,609,062 | B2 * | 8/2003 | Hancock | 701/200 |
| 6,703,947 | B1 * | 3/2004 | Wallner | 341/50 |
| 7,007,228 | B1 * | 2/2006 | Carro | 715/513 |
| 7,142,196 | B1 * | 11/2006 | Connor et al. | 345/173 |
| 2001/0016788 | A1 * | 8/2001 | Hauwiller et al. | 700/283 |
| 2002/0078035 | A1 * | 6/2002 | Frank et al. | 707/3 |
| 2002/0133347 | A1 * | 9/2002 | Schoneburg et al. | 704/257 |

FOREIGN PATENT DOCUMENTS

WO    WO 9607170 A1    3/1996

OTHER PUBLICATIONS

"Decentralized GIS Web Services on Grid" Proceedings of the *Open Source GID—GRASS users conference 2002*, Italy, Sep. 11-13, 2002 by Apirak Panatkool and Sitthichai Laoverreakul.
"Efficient Web Browsing for Mobile Clients using HTTP Compression", by Ronny Krashinsky, Dec. 11, 2000, pp. 1-8.
"GRASS on the Web", by Sigrid Hess, Proceedings of the *Open Source GIS—GRASS users conference 2002*-Trento, Italy, Sep. 11-13, 2002. pp. 1-14.
The Geographical Anteserver:a Client/Server Architecture for GIS Paper Proposal for EODEO '98, by Maruice Szmurlo et al. Nov. 29, 1997.

(Continued)

*Primary Examiner*—Tuan C To
(74) *Attorney, Agent, or Firm*—Westman, Champlin & Kelly, P.A.

(57) ABSTRACT

Methods are disclosed for encoding latitude/longitude coordinates within a URL in a relatively compact form. The method includes converting latitude and longitude coordinates from floating-point numbers to non-negative integers. A set of base-N string representations are generated for the integers (N represents the number of characters in an implementation-defined character set being utilized). The latitude string and longitude string are then concatenated to yield a single output string. The output string is utilized as a geographic indicator with a URL.

20 Claims, 8 Drawing Sheets

OTHER PUBLICATIONS

"Deductive Object-Oriented Database for Geopgraphic Data Handling" for a Course Project CMPT826: Data and Process Modeling, by Mohammad Ashrafuzzaman, Mar. 1, 1996, pp. 1-34.

Section 1: Base-n Concepts, Base-n Concepts, by Dr. James F. Wirth, 2001, pp. 1-15. Located on the Internet at http://core.ecu.edu/csci/wirthj/Basen/basen-c.html.

"URL Forwarding and Compression in Adaptive Web Caching" INFOCOMM 2000, by B. Scott Michel et al. pp. 1-10.

NAC Geographic Products Inc.—Press Release, "Does Microsoft Infringe the Natural Area Coding System," Geoplace.com Printed from Internet on Jul. 28, 2005., pp. 1-5.

* cited by examiner

COMPACT TEXT ENCODING OF LATITUDE/LONGITUDE COORDINATES

BACKGROUND OF THE INVENTION

The present invention relates to the encoding of a geographic location in an address line associated with a web page. More particularly, the present invention relates to a method of encoding latitude and longitude coordinates in a Uniform Resource Locator (URL) associated with a web page.

Certain web sites, such as those that involve serving up maps of arbitrary locations, require an encoding of latitude/longitude coordinates. There are at least two ways to accomplish the encoding. One is to provide the coordinates in a URL that is utilized to access a web page that is specifically related to the coordinates. The other way is to include the coordinates in a server-side persistent state, relying on a "session" with the user. The former approach has advantages over the latter, in that it requires significantly less infrastructure on the server side, and provides additional conveniences to users such as the ability to bookmark map pages. However, URLs are subject to significant length constraints, particularly in association with mobile devices. It is advantageous for URLs to be as short as possible, and preferably be human-typeable.

A point on the earth's surface is commonly represented by a pair of floating-point numbers, namely, numerical representations of latitude and longitude. A common representation of such numerical values in computer applications is in decimal degrees. A 1-degree arc of the earth's surface is roughly 110,000 meters long. This means that each latitude and longitude coordinate value must extend to five decimal places in order to yield roughly a 1-meter accuracy of representation. Thus, a typical text representation of latitude/longitude coordinates in the context of a computer application (i.e., encoded within a URL) might look something like:

122.12926,47.64932

In this representation, longitude and latitude are listed with a separator character (,) between them. The representation requires 19 characters to indicate the longitude/latitude position. Because it is desirable to keep URLs as short as possible, it would be beneficial to represent the same type of position information, to approximately the same accuracy, using a smaller number of characters.

SUMMARY OF THE INVENTION

Embodiments of the present invention pertain to a method for encoding latitude/longitude coordinates within a URL in a relatively compact form. The method includes converting latitude and longitude coordinates from floating-point numbers to non-negative integers. A set of base-N string representations are generated for the integers. (N represents the number of characters in an implementation-defined character set being utilized). The latitude string and longitude string are then concatenated to yield a single output string. The output string is utilized as a geographic indicator within a URL. To decode an output string to its corresponding latitude/longitude coordinates, the steps are inverted and performed in reverse order.

DETAILED DESCRIPTION OF ILLUSTRATIVE EMBODIMENTS

I. Overview

Figure 1:
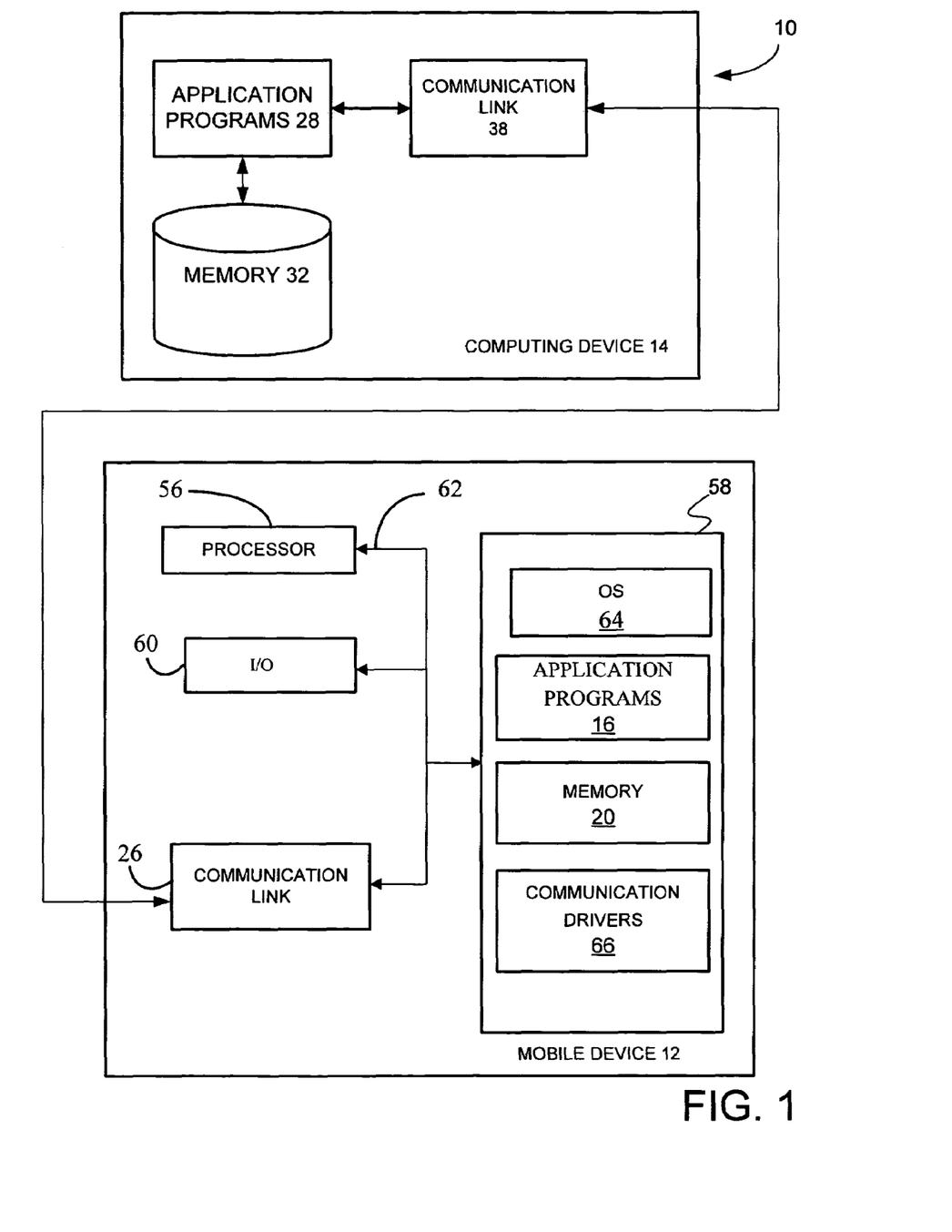
FIG. 1 is a block diagram illustrating an environment within which embodiments of the present invention can be implemented.

FIG. 1 is a block diagram of a typical environment 10 within which embodiments of the present invention can be implemented. Environment 10 includes a mobile device 12 and a computing device 14. Computing device 14 includes application programs 28, a corresponding memory 32, and communication link 38. Mobile device 12 includes application programs 16, a corresponding memory 20 and communication link 26. Mobile device 12 also includes memory 58, microprocessor 56, operating system 64, input/output (I/O) components 60, and communication drivers 66. Components of mobile device 12 are illustratively coupled for communication with one another over a suitable buss 62. It will be appreciated that both mobile device 12 and computing device 14 include a number of other non-illustrated components.

Referring to mobile device 12, memory 58 is preferably implemented as non-volatile electronic memory such as random access memory (RAM) with a battery back-up module (not shown) such that information stored in memory 58 is not lost when the general power to mobile device 12 is shut down. A portion of memory 58 is illustratively allocated as addressable memory for program execution, while another portion of memory 58 is optionally used for storage, such as to simulate storage on a disc drive. Memory 58 can include operating system 64, as well as one or more application programs 16 and corresponding memory structure 20. Application programs 16 can illustratively include GPS programs that are capable of identifying a location of mobile device 12 with latitude/longitude coordinates.

During operation, operating system 64 is illustratively executed by processor 56 from memory 58. The operating system 64 implements features that can be utilized by application programs 16 through a set of exposed application programming interfaces and methods. It will be appreciated that either or both of devices 12 and 14 could actually incorporate multiple application programs each with a corresponding memory, rather than the illustrated single collection of application programs with a single corresponding memory.

I/O components 60, in one embodiment, are provided to facilitate input and output operations in association with a user of mobile device 12. I/O components 60 for various embodiments of mobile device 12 can include input components such as buttons and touch sensors, as well as output components such as a display, a speaker, and/or a printer port. Other I/O components are conceivable and within the scope of the present invention.

Communication link 26 is any suitable communication interface. Interface 26 is illustratively used to communicate with computing device 14. Memory 58 includes a set of communication drivers 66 that interact with communication link 26, and that translate data to and from the appropriate communication protocol necessary to enable communication across the link 26.

In one illustrative embodiment of the present invention, application programs 16 include Personal Information Manager (PIM) programs, which support, for example, electronic mail messaging, scheduling, calendering, etc. Of course, application programs 16 can be configured to support a wide variety of other features, such as task lists and personalized address books, to name a few. Memory 20 is configured to store a plurality of individual records or objects, each comprising a plurality of fields or properties related to application programs 16.

In one illustrative embodiment of the present invention, application programs 28 include a program configured to serve up maps of arbitrary locations. Of course, application programs 28 can be configured to support a wide variety of other features and functions. Memory 32 is configured to store a plurality of individual records or objects, each comprising a plurality of fields or properties related to application programs 28. In accordance with one embodiment, memory 32 is configured to store a plurality of maps associated with the previously mentioned map-oriented application program 28.

Application programs 16 and 28 communicate with each other through two-way communication links 26 and 38. Communication links 26 and 38 are illustratively commercially available communication links that implement a suitable communications protocol. For example, in one illustrative embodiment, mobile device 12 is connected to computing device 14 with a physical cable which communicates using a serial communication protocol. Other communication mechanisms are also contemplated by the present invention, such as but not limited to infra-red (IR) communication, direct modem communication, remote dial-up-networking communication, communication through commercially available network cards (i.e., using TCP/IP), remote access services (RAS), wireless modem communication, wireless cellular digital packet data (CDPD), wireless Bluetooth™ communication, FireWire communication, or any other suitable communication mechanism or means. Although the communication links are shown as being internal to mobile device 12 and computing device 14, those skilled in the art will recognize that at least portions of the communication links may exist outside of the devices.

In accordance with one aspect of the present invention, computing device 14 is configured to provide mobile device 12 access to geographic-oriented applications and/or information. In accordance with one specific embodiment, computing device 14 is configured to operate as a server that serves up maps of arbitrary locations to mobile device 12. Computing device 14 is illustratively a server that operates on a network such as, but not limited to, the Internet. In accordance with one embodiment, mobile device 12 access the information stored on computing device 14 by way of a World Wide Web interface.

For computing device 14 to provide mobile device 12 with access to geographic-oriented applications and/or information, it is convenient for latitude/longitude coordinates to be embedded in a URL string that is passed from mobile device 12 to computer device 14. The URL is transferred from mobile device 12 to computing device 14 by way of the corresponding communication links. The URL illustratively includes a value to represent a specific geographic position in terms of its latitude and longitude. Based on this value, application 28 returns a web page or document to mobile device 12 that is associated with the geographic position set in the URL. For example, application program 28 can retrieve a specific map from memory 32 that corresponds to the specific latitude/longitude coordinates.

In accordance with one embodiment, the specific latitude/longitude coordinates embedded in the URL are coordinates retrieved from a GPS-oriented program 16. In accordance with another embodiment, the coordinates are simply user selected through interaction with an application program 16 (i.e., a user selects a point on a map and corresponding coordinates are automatically inserted into a URL that is to be sent to computing device 14).

II. Computing Device 14

It should be noted that devices 12 and 14 are only examples of suitable computing devices and are not intended to suggest any limitation as to the scope of use or functionality of the present invention. Neither should devices 12 and 14 be interpreted as having any dependency or requirement relating to any one or combination of components illustrated in FIG. 1 or any subsequently described Figure.

The present invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephone systems, distributed computing environments that include any of the above systems or devices, and the like.

The present invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by a remote processing devices that are linked through a communications network. In a distributed computing environment, program modules may be located in both local and remote storage media including memory storage devices.

Figure 2:
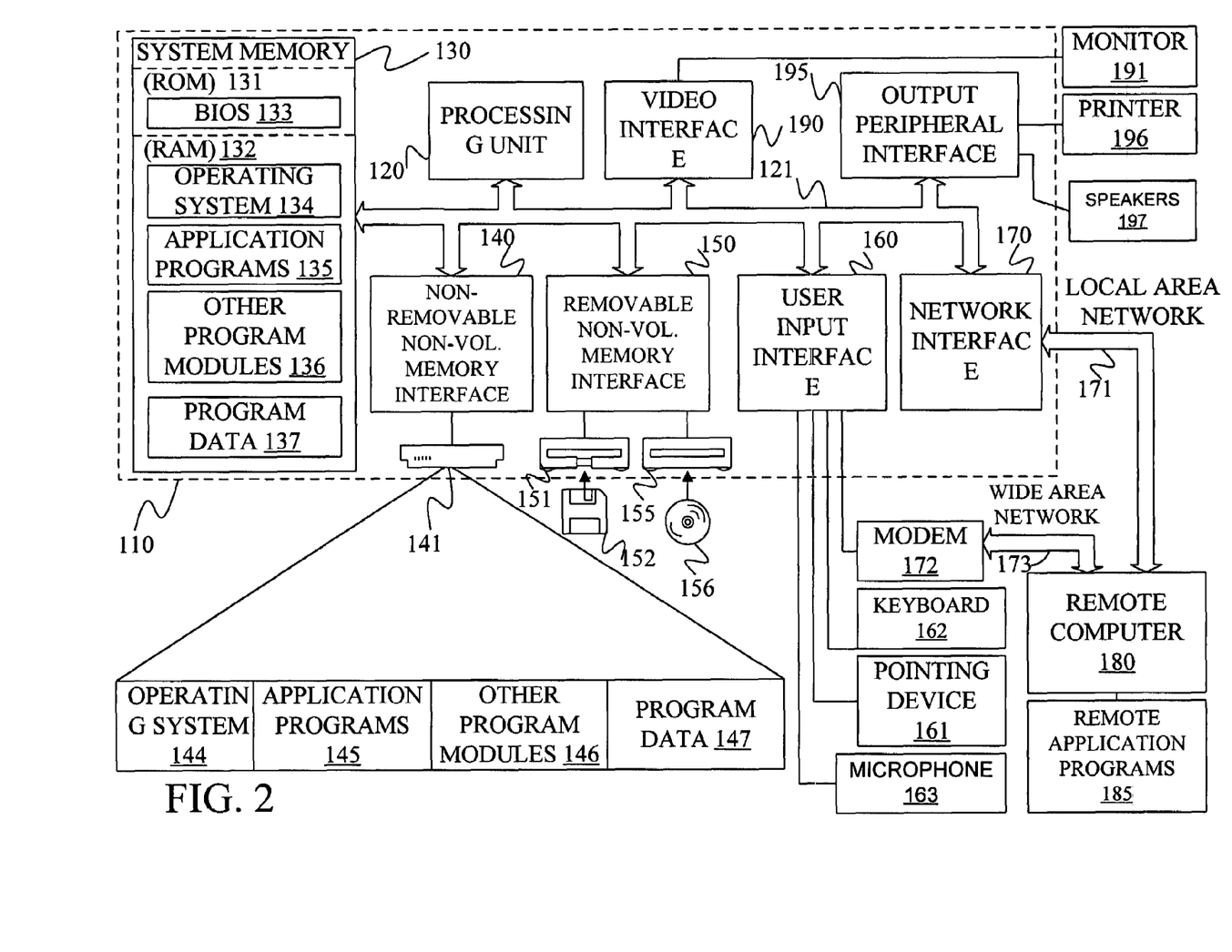
FIG. 2 is a block diagram of one embodiment of a computing device.

With reference to FIG. 2, an exemplary system for implementing embodiments of the present invention includes a general-purpose computing device in the form of a computer 110. Computer 110 is illustrative configured to operate as computing device 14 in FIG. 1. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180, which can include mobile device 12. The remote computer 180 may be a personal computer, a hand-held device, a server, a router, a network PC, a peer device or other common network node, and typically includes many or all of the elements described above relative to the computer 110. The logical connections depicted in FIG. 2 include a local area network (LAN) 171 and a wide area network (WAN) 173, but may also include other networks. Such networking environments are commonplace in offices, enterprise-wide computer networks, intranets and the Internet. In addition, the network connections between any of the nodes in the network may include direct cable connections or wireless connections and the connection between computer 110 and remote computer 180 may include any number of nodes and/or routers.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on remote computer 180. It will be appreciated that the network connections shown are exemplary and other means of establishing a communications link between the computers may be used.

III. Mobile Device 12

Figure 3:
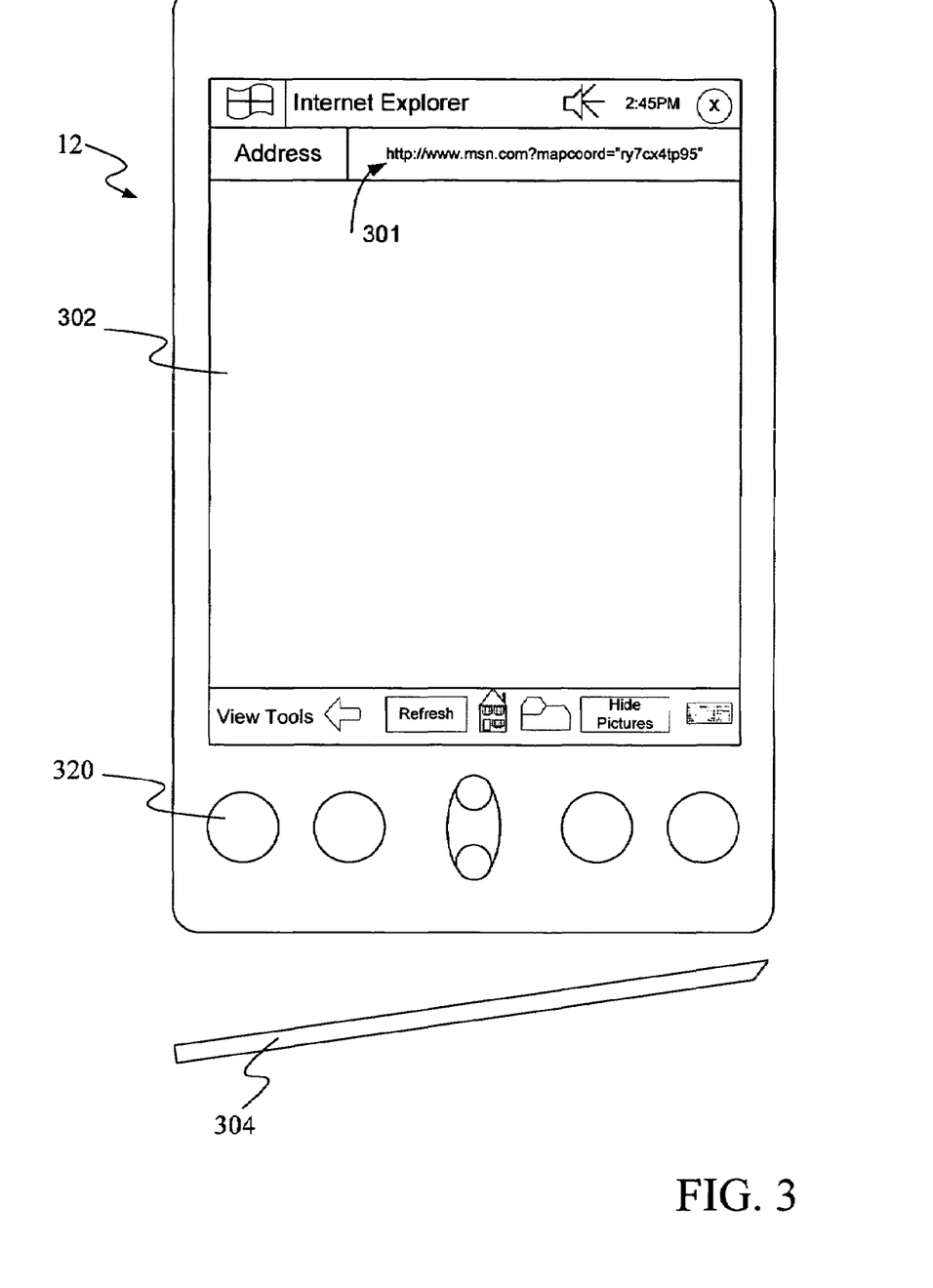
FIG. 3 is a simplified pictorial illustration of one embodiment of a mobile device.

FIG. 3 is a simplified pictorial illustration of one embodiment of a mobile device 12 which can be used in accordance with the present invention. Mobile device 12, as shown in FIG. 3, includes a screen 302 that can sense the position of stylus 304 relative to the screen and thereby allow the user to select objects on the screen, as well as write and draw through screen input. The mobile device 12 shown in FIG. 3 also includes a number of user input keys or buttons, such as button 320, which allow the user to scroll through menu options or other display options which are displayed on display 302, or which allow the user to change applications or select user input functions, without contacting display 302.

It should be noted that display 302 will typically be much smaller than a conventional display used with a desktop computer. For example, display 302 may be defined by a matrix of only 240×320 coordinates or 160×160 coordinates, or any other suitable size. It is conceivable that device 12 could be a pager, and in such case, the display may be even smaller than described.

Although not illustrated, mobile device 12 of FIG. 3 also includes an antenna that supports wireless communication with the device. Also included are one or more communication ports, such as a serial or USB port, or a Local Area Network (LAN) port, that support wired communication.

The mobile device of FIG. 3 is illustrated with a World Wide Web Internet browser operating thereon. Device 12 is illustratively configured to access web pages utilizing such a browser. As is known in the art, the web pages are accessed using a URL such as the illustrated URL 301 which designates an address of a page as well as a set of parameters and parameter values which follow a question mark in the URL string. For example, URL 301 contains a geographic parameter "mapcoord", which has a parameter value "ry7cx4tp95" that is consistent with embodiments of the present invention that will be described in detail below in association with other Figures.

Figure 4:
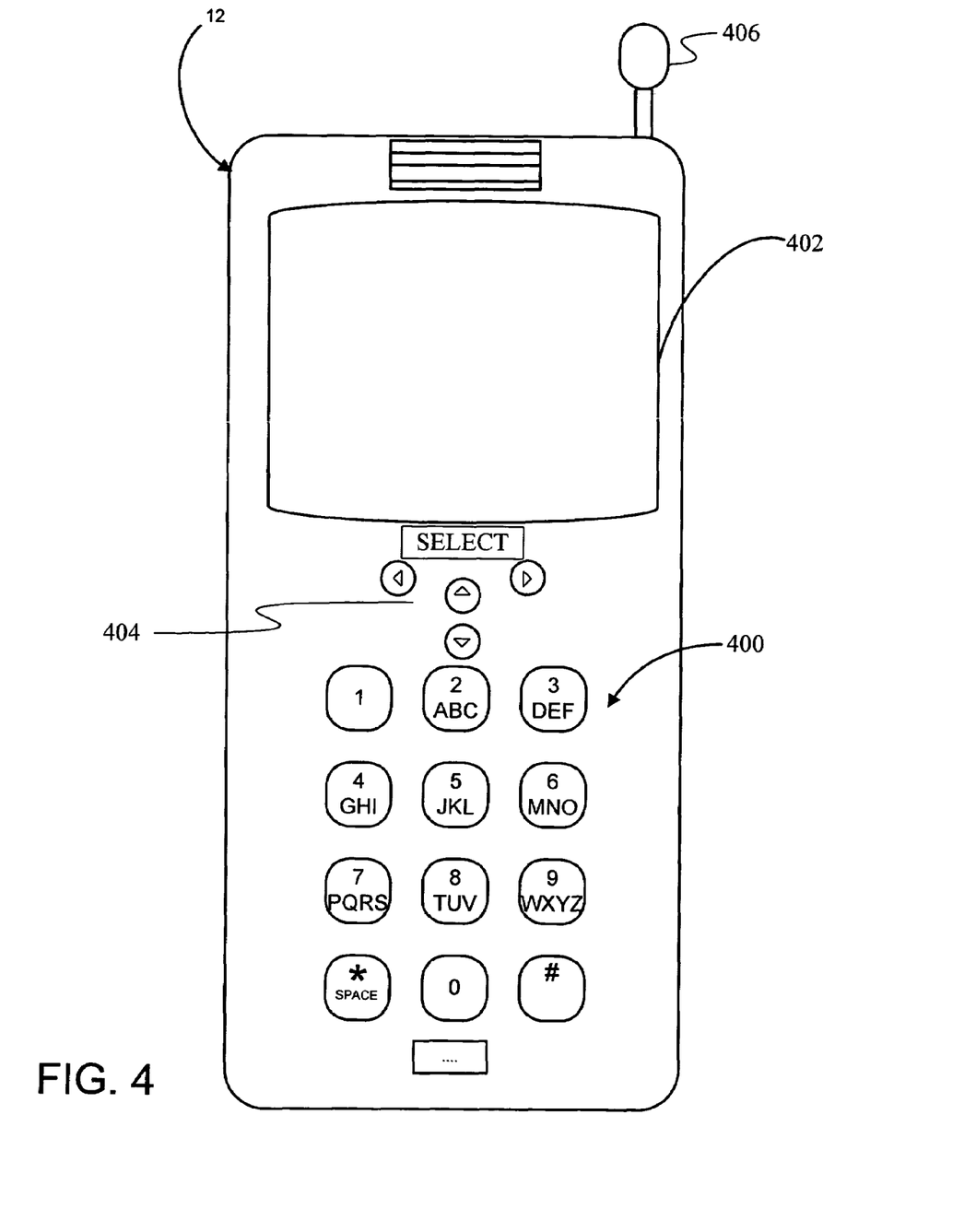
FIG. 4 is a simplified pictorial illustration of another embodiment of a mobile device.

FIG. 4 provides a pictorial diagram of a phone embodiment of a mobile device 12. The phone includes a set of keypads 400 for dialing phone numbers, a display 402 capable of displaying application images, and control buttons 404 for selecting items shown on the display. The phone includes an antenna 406 for receiving and sending cellular phone signals such as General Packet Radio Service (GPRS) and 1Xrtt, and Short Message Service (SMS) signals. When operating in association with a cellular phone signal, the phone establishes a connection with a carrier. Generally, the carrier charges a fee based on the length of time that this connection is maintained. The phone of FIG. 4 is illustratively configured to submit URLs having embedded coordinates to access geographic-oriented information from a server. Note that other forms of mobile devices are possible and within the scope of the present invention. Other examples include tablet PCs and wireless-enabled lap-top computers.

IV. Overview of Coordinate Consolidation

As has been discussed above, web sites that provide access to geographic-oriented applications and/or information (i.e. sites that involve serving up maps of arbitrary locations) are particularly effective when specific latitude/longitude coordinates are directly imbedded in URLs utilized to access web pages. As has been discussed, however, URLs are subjected to significant length constraints.

A concise and effective technique for representing coordinates associated with a point on the earth's surface to an arbitrary accuracy will illustratively be subject to the following constraints:

1. The representation should be limited to an arbitrary character set. One example of such a set includes ASCII characters that are usable in URLs.

2. The representation should be as compact as possible (requires as few characters as possible).
3. The representation should be human-readable and human-typeable.

A point on the earth's surface is commonly represented by a pair of floating-point numbers, namely, numerical representations of latitude and longitude. A common representation of such numerical values in computer applications is in decimal degrees. A 1-degree arc of the earth's surface is roughly 110,000 meters long. This means that each latitude and longitude coordinate value must extend to five decimal places in order to yield roughly a 1-meter accuracy of representation. Thus, a typical text representation of a latitude/longitude coordinate in a URL might look something like:

122.12926,47.64932

In this representation, longitude and latitude are listed with a separator character (,) between them. The representation requires 19 characters to represent the longitude/latitude position. Because it is desirable to keep URLs as short as possible, it would be beneficial to represent the same position information, to approximately the same accuracy, using a smaller number of characters.

Figure 5:
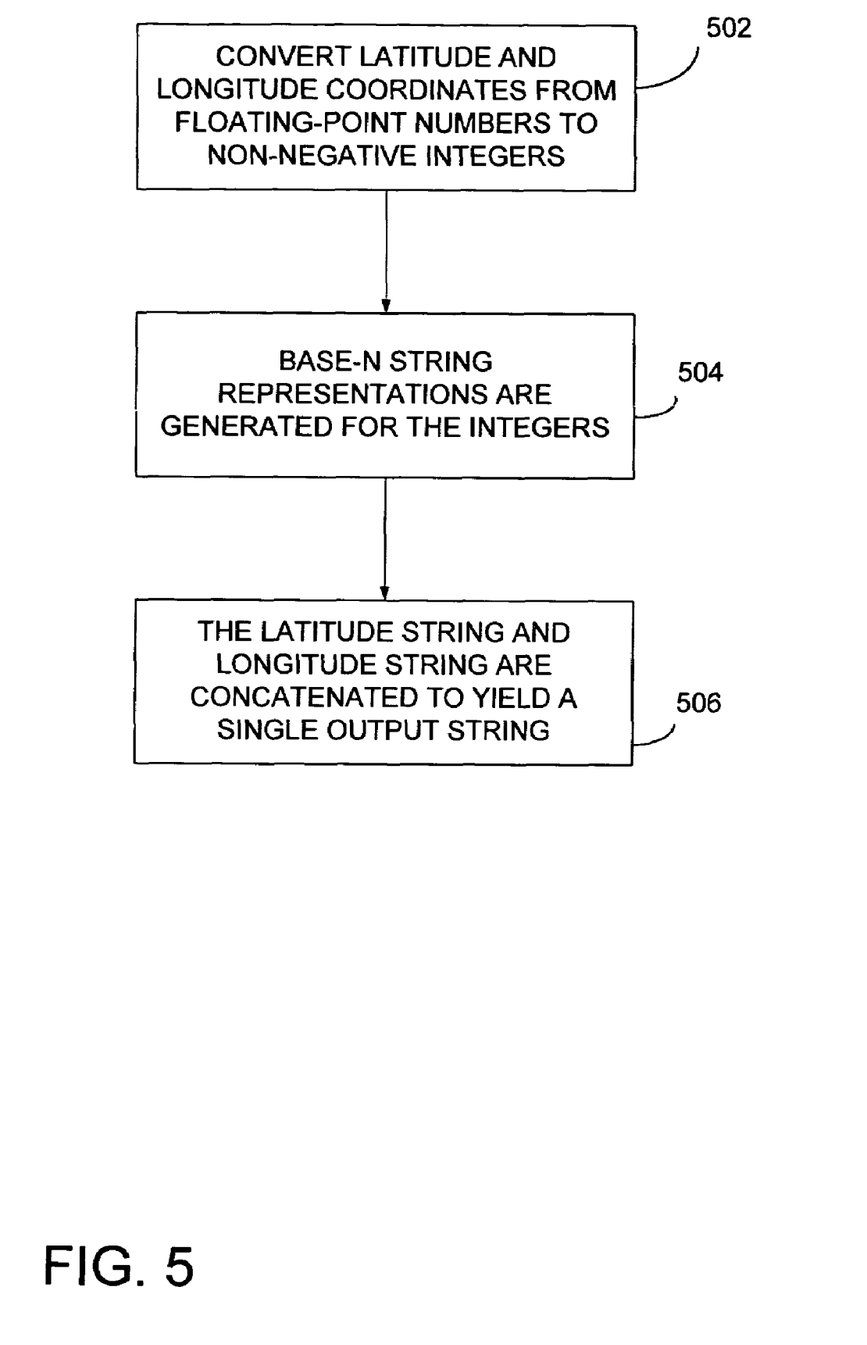
FIG. 5 is a flow diagram of a method for generating a representation of latitude/longitude coordinates in a relatively compact fashion.

FIG. 5, in accordance with one aspect of the present invention, is a flow diagram of a method for generating a representation of latitude/longitude coordinates in a relatively compact fashion. The relatively compact representation is advantageous because it takes up a reduced portion of any URL within which it is incorporated.

The method of FIG. 5 assumes a beginning pair of floating-point latitude/longitude coordinates. As is indicated by block 502, the first step in the method is to convert latitude and longitude coordinates from floating-point numbers to non-negative integers. As will be described in relation to FIG. 7, to support the conversion, a system of mapping is illustratively utilized that generally preserves a desired level of accuracy. In accordance with block 504, the next step is to generate base-N string representations for the integers, where N represents the number of characters in an implementation-defined character set being utilized. In accordance with block 506, the final step is to concatenate the latitude string and longitude string so as to yield a single output string.

Figure 6:
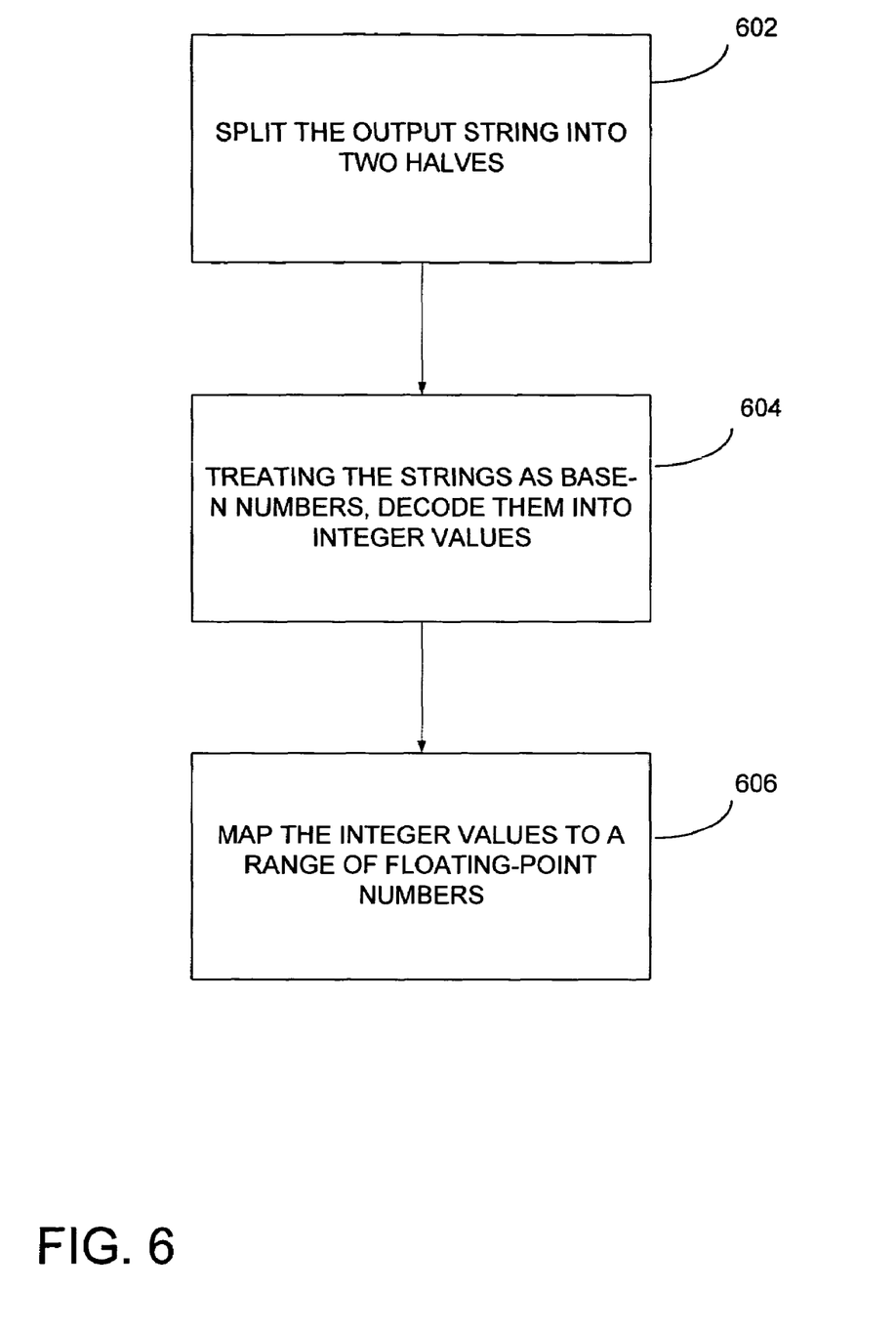
FIG. 6 is a flow diagram of a method for decoding a consolidated representation to its original latitude/longitude coordinates.

FIG. 6, in accordance with one aspect of the present invention illustrates a method for decoding an output string to its originating latitude/longitude coordinates. In general, to decode, the method of FIG. 5 is inverted and executed in reverse order. In accordance with block 602, the output string is split into two halves, one for latitude and one for longitude. In accordance with block 604, treating the strings as base-N numbers, the strings themselves are decoded to integer values. Finally, in accordance with block 606, the integer values are mapped to floating-point numbers that correspond to the originating latitude/longitude coordinates.

V. Coordinate Consolidation in Detail

Figure 7:
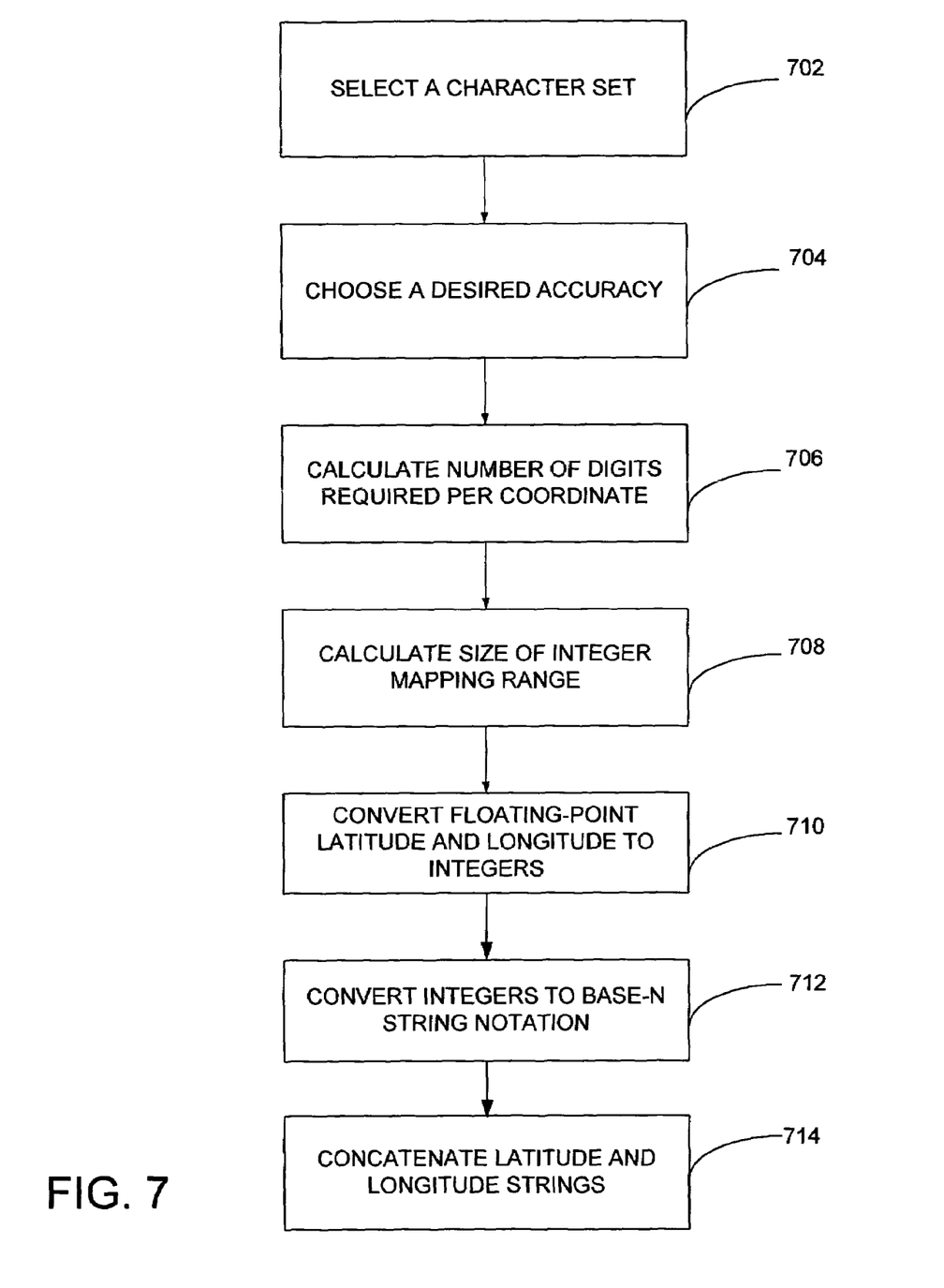
FIG. 7 is a flow diagram of a method for establishing a consolidation scheme and consolidating latitude/longitude coordinates.

FIG. 7 is a more detailed description of the method described in relation to FIG. 5 and includes details related to setting up a scheme to accommodate the described consolidation of coordinates.

In accordance with block 702, the first step in the method is to select a character set. The particular set of characters to be utilized is adjustable and can be selected to accommodate a particular implementation. For example, if a particular implementation involves converting latitude/longitude coordinates into a condensed parameter for incorporation into a URL, one might choose the following character set:

0123456789bcdfghjkmnpqrstvwxyz
(30 characters in the set)

The larger the number of characters in the set, the more compact the resulting coordinate string will be. In other words, the length of the representation is inversely proportional to the logarithm of the number of characters. The example character set above is advantageous in that it uses a fairly large number of characters (all numerals and most letters). The set deliberately omits vowels to avoid the possibility of the algorithm inadvertently generating real words that could be offensive. The letter 1 has also been omitted to avoided possible confusion with the number 1. The example character set also uses lower-case letters only in order to make generated strings more human-friendly to type. For example, any capital letters entered by the user can be converted to lower case letter before decoding the coordinate string. Another advantage of the character set above is that it only includes characters that can be transmitted freely, and does not include characters that are excluded by certain encoding algorithms such as UUencoding.

In accordance with block 704, the next step is to choose a desired level of accuracy. The accuracy of a resulting coordinate representation is illustratively adjustable and can be selected to accommodate a particular implementation. A given implementation will have a certain requirement for how accurate string representations must be. The question becomes, if one were to take a pair of full double-precision, floating-point numbers representing latitude and longitude, convert them to a compact string representation using the techniques outlined herein, then convert the string representation back into double-precision, floating-point numbers, what is the maximum allowable error? The smaller the allowable error, the longer the string representations of coordinates should be. String length is inversely proportional to the logarithm of the allowable error.

In order to facilitate description of embodiments of the present invention, it will be assumed that an accuracy of 2 meters is required in the context of subsequent examples.

In accordance with block 806, the next step in the method is to calculate the number of digits required per coordinate. For a given character set (step 802) and required accuracy (step 804), we can calculate the number of digits required to represent a latitude or longitude:

$$D = \text{ceiling}[ln(C_{earth}/L_{error})/ln(N)] \qquad \text{Eq. 1}$$

where D is the number of digits required, $C_{earth}$ is the circumference of the earth, $L_{error}$ is the allowed error size, and N is the number of characters in the set. The term "ceiling" represents the "smallest integer greater than or equal to".

In the presently running example, $L_{error}$ is 2 meters and N is 30 characters. Using a value of $4.0024 \times 10^7$ meters for $C_{earth}$, this yields a value of 5 for D.

In accordance with block 708, the next step is to calculate the size of an integer mapping range. Latitudes and longitudes will illustratively be mapped to a range of integers in the range of 0 to M (inclusive), where M is calculated as follows:

$$M = N^D - 1 \qquad \text{Eq. 2}$$

where N and D are defined in step 706. In the context of the presently running example, N is 30 and D is 5, so the resulting value of M is 24,299,999.

It should be noted that steps 702 through 708 need be performed only once for a given application. In contrast, steps 710 through 714 are performed for each latitude/longitude coordinate pair that requires encoding.

In accordance with block 710, the first step in the conversion of a latitude/longitude coordinate pair is to convert floating-point latitude and longitude strings to integers. Given a floating-point latitude (in the range of −90 to +90) and longitude (in the range of −180 to +180), the floating-point strings are converted to integers. Conversion illustratively follows the formula:

$$Val_{int} = \text{round}\left[M \times \frac{(Val_{float} - Val_{min})}{(Val_{max} - Val_{min})}\right] \qquad \text{Eq. 3}$$

where $Val_{int}$ is the resulting integer value, M is the value from step 708, $Val_{float}$ is the floating-point value, $Val_{min}$ is the minimum value of the floating-point range, and $Val_{max}$ is the maximum value of the floating-point range. The term "round" represents the nearest integer value to the specified floating-point value, e.g. round(2.3) is 2, round(2.7) is 3. Also, it should be noted that all mathematical operations within the square brackets [0] in Eq. 3 are floating-point, i.e. not integer, operations. For latitude, $Val_{min}$ is −90 and $Val_{max}$ is +90. For longitude, these values are −180 and +180, respectively.

In the context of the currently running example, a latitude of 47.64932 converts to the integer value of 18,582,657. A longitude of −122.12926 converts to the integer value 3,906,275.

In accordance with block 712, the next step in the method is to convert the integers to base-N string notation. To accommodate conversion, the first character in the character set is assigned a numeric value of 0, the next character is assigned a numeric value of 1, the next character is assigned 2, and so forth all the way up to the last character in the set, which has a numeric value of N−1 (where N is the number of characters in the set). Utilizing this as the numeric set of digits, the integer values are represented in base-N notation. The number of required digits D was determined in step 706. If the resulting string has fewer than D digits in it, the left side of the string is padded with as many "zeros" (meaning the first character in the character set) as are required to make a total of D digits.

Figure 8:
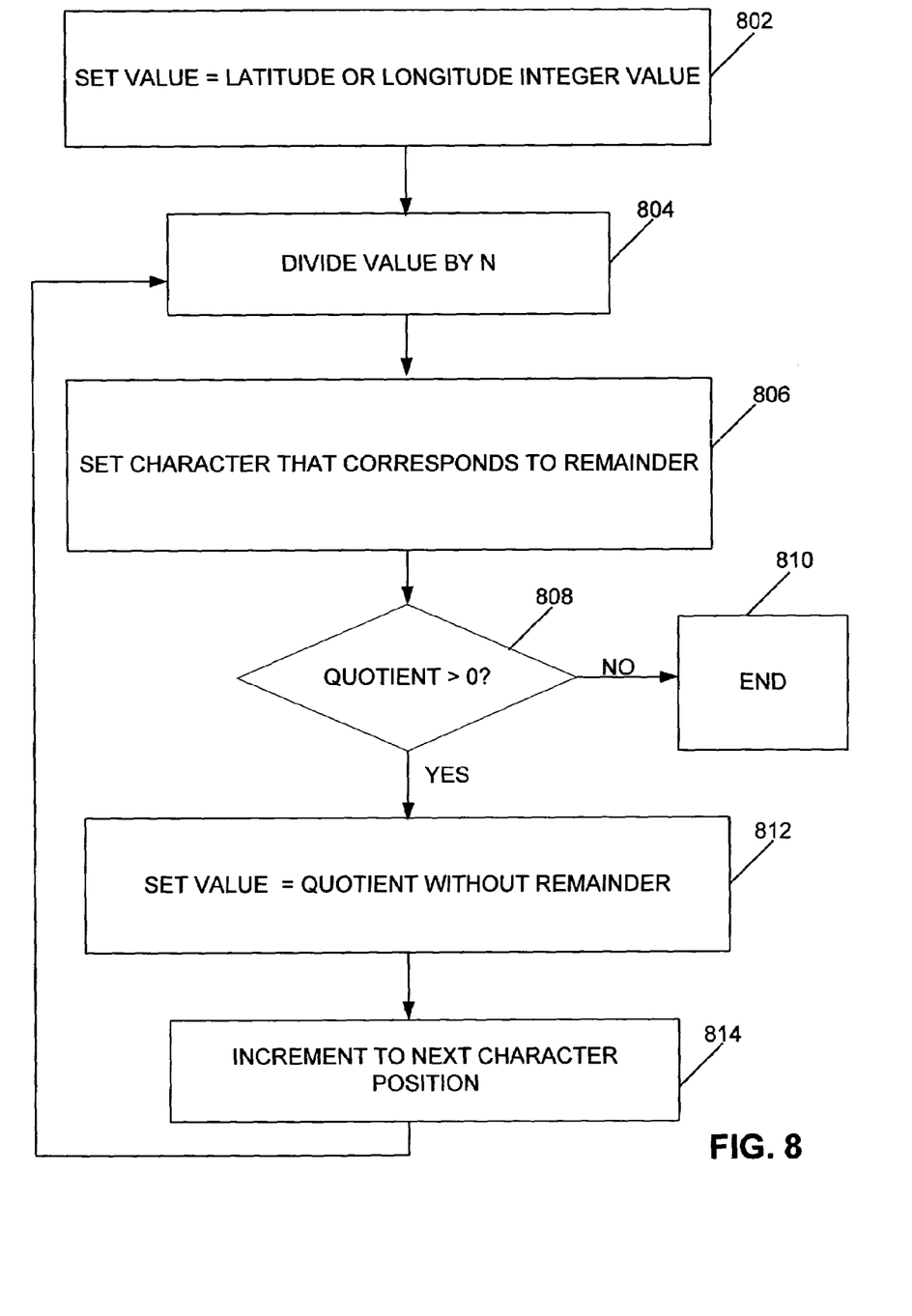
FIG. 8 is a flow diagram illustrating a method utilized to convert integers to base-N notation.

FIG. 8 is a flow diagram illustrating a method that can be utilized to convert the integers to base-N notation. As is indicated by block 802, one of the latitude or longitude integers is set as an initial value (i.e., either 18,582,657 or 3,906,275 is set as the initial value). In accordance with block 804, the initial value is divided by N (i.e., divided by 30). In accordance with block 806, the character from the character set that corresponds to the value of the remainder is set as the first character in the base-N string notation. For example, if the remainder is "22", then the character "r", which is the 22nd character in the character set above, would be sent as the first character. Then, if the quotient is not greater than 0 (block 808), the process ends and zeros are utilized to pad the base-N notation if necessary. Assuming the quotient is greater than zero, the quotient, without the remainder, is set as the next value in accordance with block 812. In accordance with block 814, the character position is shifted to the next character position in the base-N notation. This process is repeated until the quotient is less than zero. The base-N notation is basically derived in this manner or with a process substantially similar thereto.

In the running example, using the character set outlined above in step 702, a latitude-based integer value of 18,582, 657 converts to a base-N notation of ry7cx. A longitude-based integer value of 3,906,275 converts to 4tp95.

In accordance with block 714, the last step in the FIG. 7 method is to concatenate latitude and longitude strings. The strings are concatenated to yield a single output value. In our running example, the encoded string resulting from the latitude/longitude coordinate would be "ry7cx4tp95".

In order to decode an encoded latitude/longitude string generated in accordance with the FIG. 7 method (such as ry7cx4tp95 in the running example) to the originating latitude and longitude representations, the calculations performed in steps 814, 812, and 810 are inverted and performed in reverse order.

Specifically, the string in base-N notation is divided into two sub-strings. Each base-N sub-string is converted into a base-10 sub-string. This can be accomplished by converting each character in the sub-string into its numbered position equivalent. For example, the character "d" is converted into "13". The lowest order number (lowest position in the sub-string) is multiplied by $30^0$. The second lowest order number is multiplied by $30^1$ and so fourth until the highest order number is multiplied by $30^4$. The resulting products from these multiplications are summed to form an integer value. The process is repeated for each sub-string so that separate integer values are produced for latitude and longitude.

The integer values are converted into floating point numbers using the following formula:

$$Val_{float} = \frac{Val_{int}}{M}(Val_{max} - Val_{min}) + Val_{min} \qquad \text{Eq. 4}$$

In accordance with one embodiment, steps 710 through 714 are performed on a client computing device, and the resulting latitude/longitude string is embedded in a URL that is transmitted to a server computing device. On the server computing device, the inverse of steps 710 through 714 are performed in reverse order to obtain the originating latitude and longitude coordinates. The coordinates are then utilized by the server computing device to provide the client with geographic-oriented applications and/or information.

Accordingly, the methods of FIGS. 5 through 7 provide a method for encoding latitude and longitude coordinates to an arbitrary accuracy using ASCII (American Standard Code for Information Interchange) characters that are usable in URLs. The encoded character strings are significantly compact representations of latitude/longitude coordinates, are human readable, and may be entered from a standard keyboard.

It should be noted that the present description refers to coordinates in terms of "latitude" and "longitude" as an example only. The present invention is not limited to coordinates of the latitude/longitude variety. The present invention could be applied to any spatial coordinate system. Latitude and longitude is simply one common implementation of a spatial coordinate system within the scope of the present invention. In addition, it should be noted that embodiments of the present invention can be utilized for any system in which locations are represented by sets of floating point numbers. There are numerous coordinate systems used by GIS or GPS systems to represent location on the surface of the earth, latitude and longitude being just one example within the scope of the present invention. Embodiments of the present invention are applicable to applications that utilize X-Y coordinates in UTM (Universal Transverse Mercator), or any one of a number of other coordinate systems. Embodiments of the present invention are also applicable to non-geographic coordinates. For example, they could apply to a system that records the locations of objects in some 3D space as (X,Y,Z) coordinates. In such cases, the algorithms defined herein are just as easily applicable to the three coordinate scheme of identification.

It should be noted that embodiments of the present invention are generally beneficial in that they enable floating-point numbers to be converted into a compact ASCII string. Application within URL's is only one example where such compact strings are beneficial. Other application scenarios are within the scope of the present invention. The scheme for generating the compact strings can be applied in any place where one needs to transmit or store binary floating-point information, with the constraints that one has to limit some arbitrary character set and one wants to make it as compact as possible while preserving a desired level of accuracy. Relevant applications are not limited to those involving transmission over a network, but also include storage in data files, etc.

Although the present invention has been described with reference to particular embodiments, workers skilled in the art will recognize that changes may be made in form and detail without departing from the spirit and scope of the invention.

What is claimed is:

1. A computer implemented method of reducing the number of characters required to represent coordinates within a geographically-oriented string, the method comprising:

selecting a character set having a predetermined number of characters;

selecting a maximum level of allowable error;

calculating, based at least in part on the predetermined number of characters and the maximum level of allowable error, a number of character spaces required to represent a coordinate;

deriving a reduced-character string representation of a coordinate based, at least in part, on the predetermined number of characters, the allowable error, and the number of character spaces; and placing the reduced-character string representation of the coordinate within the geographically-oriented string; and wherein deriving the reduced-character string representation comprises determining an integer mapping range based at least in part on the number of character spaces, and based at least in part on the predetermined number of characters.

2. The method of claim 1, wherein the geographically-oriented string is a geographically-oriented Uniform Resource Locator.

3. The method of claim 1, wherein deriving a reduced-character string representation further comprises determining a latitude base-N string and a longitude base-N string.

4. The method of claim 3, further comprising concatenating the latitude base-N string and the longitude base-N string to derive a concatenated coordinate string.

5. The method of claim 4, wherein placing the reduced-character string representation within the geographically-oriented string comprises placing the concatenated coordinate string within the geographically-oriented string.

6. A computer implemented method of reducing the number of characters required to represent coordinates within a geographically-oriented string, the method comprising:

selecting a character set having a predetermined number of characters;

selecting a maximum level of allowable error;

calculating, based at least in part on the predetermined number of characters and the maximum level of allowable error, a number of character spaces required to represent a coordinate;

deriving a reduced-character string representation of a coordinate based, at least in part, on the predetermined number of characters, the allowable error, and the number of character spaces, wherein deriving a reduced-character string representation comprises determining an integer mapping range and converting a floating point coordinate to an integer value based at least in part on the size of the integer mapping range; and placing the reduced-character string representation of the coordinate within the geographically-oriented string.

7. The method of claim 6, wherein converting a floating point coordinate comprises converting a latitude coordinate.

8. The method of claim 6, wherein converting a floating point coordinate comprises converting a longitude coordinate.

9. The method of claim 6, wherein deriving a reduced-character string representation further comprises:

converting the integer value to a base-N string, wherein N represents the predetermined number of characters.

10. The method of claim 6, wherein the geographically-oriented string is a geographically-oriented Uniform Resource Locator.

11. The method of claim 6, wherein deriving the reduced-character string representation comprises determining an integer mapping range.

12. The method of claim 11, wherein determining an integer mapping range comprises determining an integer mapping range based at least in part on the number of character spaces, and based at least in part on the predetermined number of characters.

13. The method of claim 6, wherein deriving a reduced-character string representation further comprises determining a latitude base-N string and a longitude base-N string.

14. The method of claim 13, further comprising concatenating the latitude base-N strong and the longitude base-N string to derive a concatenated coordinate string.

15. The method of claim 14, wherein placing the reduced-character string representation within the geographically-oriented string comprises placing the concatenated coordinate string within the geographically-oriented string.

16. A computer implemented method of reducing the number of characters required to represent coordinates within a geographically-oriented string, the method comprising:

selecting a character set having a predetermined number of characters;

selecting a maximum level of allowable error;

calculating, based at least in part on the predetermined number of characters and the maximum level of allowable error, a number of character spaces required to represent a coordinate;

deriving a reduced-character string representation of a coordinate based, at least in part, on the predetermined number of characters, the allowable error, and the number of character spaces; and placing the reduced-character string representation of the coordinate within the geographically-oriented string; and wherein deriving a reduced-character string representation further comprises determining a latitude base-N string and a longitude base-N string, and wherein the method further comprises concatenating the latitude base-N string and the longitude base-N string to derive a concatenated coordinate string.

17. The method of claim 16, wherein placing the reduced-character string representation within the geographically-oriented string comprises placing the concatenated coordinate string within the geographically-oriented string.

18. The method of claim 16, wherein the geographically-oriented string is a geographically-oriented Uniform Resource Locator.

19. The method of claim 16, wherein deriving the reduced-character string representation comprises determining an integer mapping range.

20. The method of claim 19, wherein determining an integer mapping range comprises determining an integer mapping range based at least in part on the number of character spaces, and based at least in part on the predetermined number of characters.

* * * * *